US007814095B2

(12) United States Patent
Ireland

(10) Patent No.: US 7,814,095 B2
(45) Date of Patent: Oct. 12, 2010

(54) OPTIMIZING THE NAVIGATION OF ONE-TO-ONE AND ONE-TO-MANY RELATIONSHIPS USING QUERY BATCHING IN NAMED TRANSACTIONS

(75) Inventor: Evan Ireland, Wellington (NZ)

(73) Assignee: Sybase, Inc., Dublin, CA (US)

( * ) Notice: Subject to any disclaimer, the term of this patent is extended or adjusted under 35 U.S.C. 154(b) by 420 days.

(21) Appl. No.: 11/645,810

(22) Filed: Dec. 27, 2006

(65) Prior Publication Data

US 2008/0162412 A1 Jul. 3, 2008

(51) Int. Cl.
*G06F 17/30* (2006.01)
(52) U.S. Cl. .................................... 707/718
(58) Field of Classification Search ............ 707/2, 707/4, 5, 999.2, 999.4, 999.5, 718
See application file for complete search history.

(56) References Cited

U.S. PATENT DOCUMENTS

| 5,317,727 | A | * | 5/1994 | Tsuchida et al. | 707/2 |
| 5,367,675 | A | * | 11/1994 | Cheng et al. | 707/2 |
| 5,799,309 | A | * | 8/1998 | Srinivasan | 707/102 |
| 5,812,996 | A | * | 9/1998 | Rubin et al. | 707/2 |
| 5,822,749 | A | * | 10/1998 | Agarwal | 707/2 |
| 5,850,544 | A | * | 12/1998 | Parvathaneny et al. | 707/101 |
| 5,907,848 | A | * | 5/1999 | Zaiken et al. | 707/202 |
| 5,940,819 | A | * | 8/1999 | Beavin et al. | 707/2 |
| 6,341,281 | B1 | * | 1/2002 | MacNicol et al. | 707/3 |
| 6,370,524 | B1 | * | 4/2002 | Witkowski | 707/3 |
| 6,785,675 | B1 | * | 8/2004 | Graves et al. | 707/4 |
| 6,950,823 | B2 | * | 9/2005 | Amiri et al. | 707/10 |
| 7,136,850 | B2 | * | 11/2006 | Keller et al. | 707/4 |
| 7,310,639 | B2 | * | 12/2007 | Dettinger et al. | 707/4 |
| 7,389,284 | B1 | * | 6/2008 | Surlaker et al. | 707/3 |
| 2004/0205057 | A1 | * | 10/2004 | Hutchison et al. | 707/3 |

OTHER PUBLICATIONS

"Context-Based Prefetch for Implementing Objects in Relations," *Proceedings of the 25th VLDB Conference* Edinburgh, Scotland, 1999.
Prefetching Based on the Type-Level Access Pattern in Object-Relational DBMSs, *Proceedings of the 17th International Conference on Data Engineering* (ICDE '01).

* cited by examiner

*Primary Examiner*—James Trujillo
*Assistant Examiner*—Jorge A Casanova
(74) *Attorney, Agent, or Firm*—Sterne, Kessler, Goldstein & Fox PLLC

(57) ABSTRACT

A system, method, and computer program product for performing transactional prefetching are presented. Steps for sending correlated queries to a database server for processing are disclosed.

24 Claims, 5 Drawing Sheets

OPTIMIZING THE NAVIGATION OF ONE-TO-ONE AND ONE-TO-MANY RELATIONSHIPS USING QUERY BATCHING IN NAMED TRANSACTIONS

BACKGROUND OF INVENTION

1. Field of the Invention

The present invention relates generally to databases and, more particularly, to optimization of database communications.

2. Description of the Background Art

In an object-relational mapping system, it is often desirable to reduce the number of round-trip interactions between an application server and a database server by prefetching query results that may be needed at a later time.

One manner of prefetching is transactional prefetching, which involves fetching a query result at a first time during a transaction and using those results at a later time in the same transaction. Join-based prefetching is one form of transactional prefetching. Two queries can be combined into a single query using a join method. This approach has several disadvantages. If a join is applied to a one-to-many or many-to-one relationship, data from the "many" side of the relationship may be repeated in multiple result rows. Furthermore, current join-based prefetching implementations require the user to choose whether join-based prefetching is enabled at the level of defined relationships. This creates overhead in circumstances where certain information is required in one transaction but not another involving the same tables, as both transactions will request the same data whether or not it is used.

Another manner of prefetching is non-transactional prefetching. Most non-transactional prefetching systems are designed to optimize the traversal of large data sets or subsets thereof while permitting query results to be cached for use across transaction boundaries. A summary of existing non-transactional prefetching systems can be found in "Context-Based Prefetch for Implementing Objects in Relations," *Proceedings of the 25th VLDB Conference* Edinburgh, Scotland, 1999 and "Prefetching Based on the Type-Level Access Pattern in Object-Relational DBMSs," *Proceedings of the 17th International Conference on Data Engineering* (ICDE '01).

A third manner of prefetching is page-based prefetching, which relies on clustering together in the same database page some parent objects and the child objects to which they have defined relationships. An application server can fetch a page at a time from a page-based prefetching database server, therefore avoiding many round-trips to fetch child objects. This technique does not work well for transactions that do not use child objects, and does not work at all for many-to-one relationships where many parent objects share the same child.

Accordingly, what is desired is an improved approach for transactional data prefetching that is optimized for one-to-one and one-to-many relationships.

SUMMARY OF INVENTION

The invention includes a computer-implemented method for transactional prefetching, in accordance with an embodiment of the present invention. The method includes the steps of identifying a transaction, identifying a prefetch assertion, executing a first query, identifying a second and third query, wherein the second and third query are correlated according to the prefetch assertion, merging the second and third queries responsive to executing the first query, and transmitting the merged queries to a database server.

The invention further includes a computer program product comprising a computer usable medium having computer program logic recorded thereon for enabling a processor to perform transactional prefetching, in accordance with an embodiment of the present invention. The computer program logic includes a first identifying means for enabling a processor to identify a transaction, a second identifying means for enabling a processor to identify a prefetch assertion, an executing means for enabling a processor to execute a first query, a third identifying means for enabling a processor to identify a second and third query, wherein the second and third query are correlated according to the prefetch assertion, a merging means for enabling a processor to merge the second and third queries responsive to executing the first query, and transmitting means for enabling a processor to transmit the merged queries to a database server.

The invention additionally includes a system capable of transactional prefetching, in accordance with an embodiment of the present invention. The system includes a first module for identifying a transaction, a second module for identifying a prefetch assertion, a third module for executing a first query, a fourth module for identifying a second and third query, wherein the second and third query are correlated according to the prefetch assertion, a fifth module for merging the second and third queries responsive to executing the first query, and a sixth module for transmitting the merged queries to a database server.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the relevant art to make and use the invention.

Figure 1:
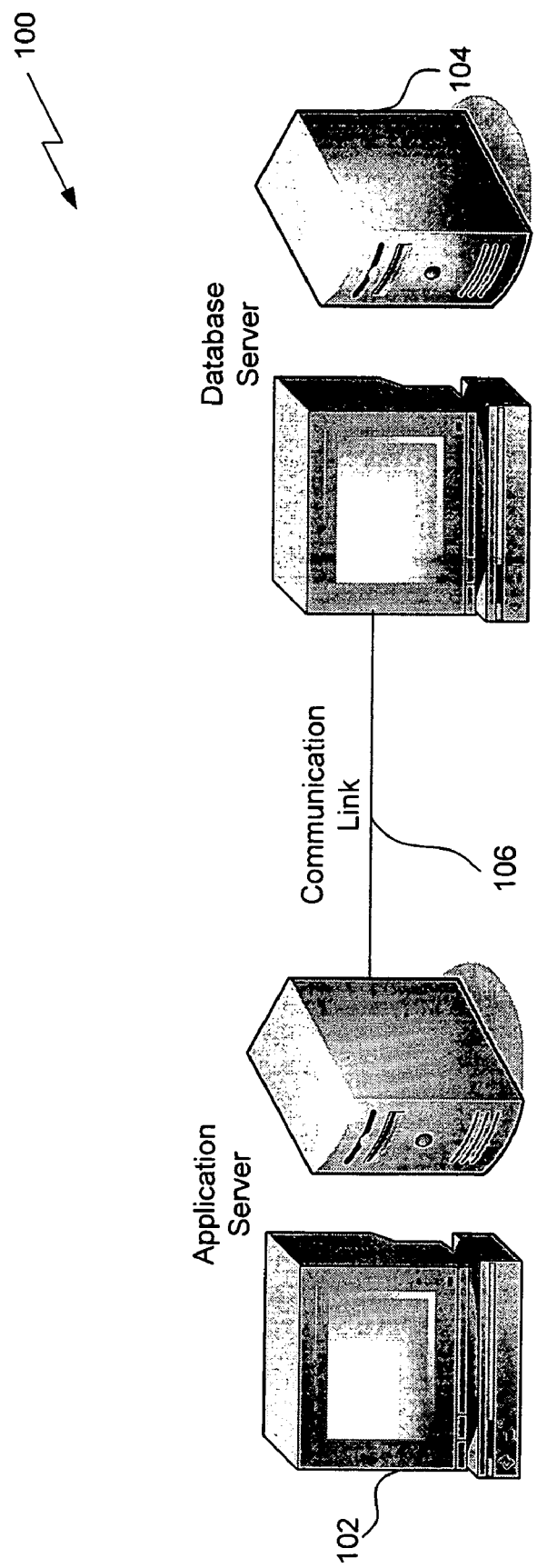
FIG. 1 depicts an example application-database interface, in accordance with an embodiment of the present invention.

The present invention will now be described with reference to the accompanying drawings. In the drawings, generally, like reference numbers indicate identical or functionally similar elements. Additionally, generally, the left-most digit (s) of a reference number identifies the drawing in which the reference number first appears.

DETAILED DESCRIPTION

1. Introduction

When developing an application that requires access to large amounts of data in a rapid manner, it is common for a developer to use a database for storage and retrieval of the data. Such a database is traditionally an independent application with which the application being developed can interact through the use of queries.

FIG. 1 illustrates an example application-database interface 100, in accordance with an embodiment of the present invention. An application server 102 is operable to process an application. The application operates by retrieving and storing data on database server 104. A communication link 106 allows application server 102 and database server 104 to communicate through the use of queries sent by the application server 102 and replies, in the form of query results, sent by the database server 104.

Figure 2:
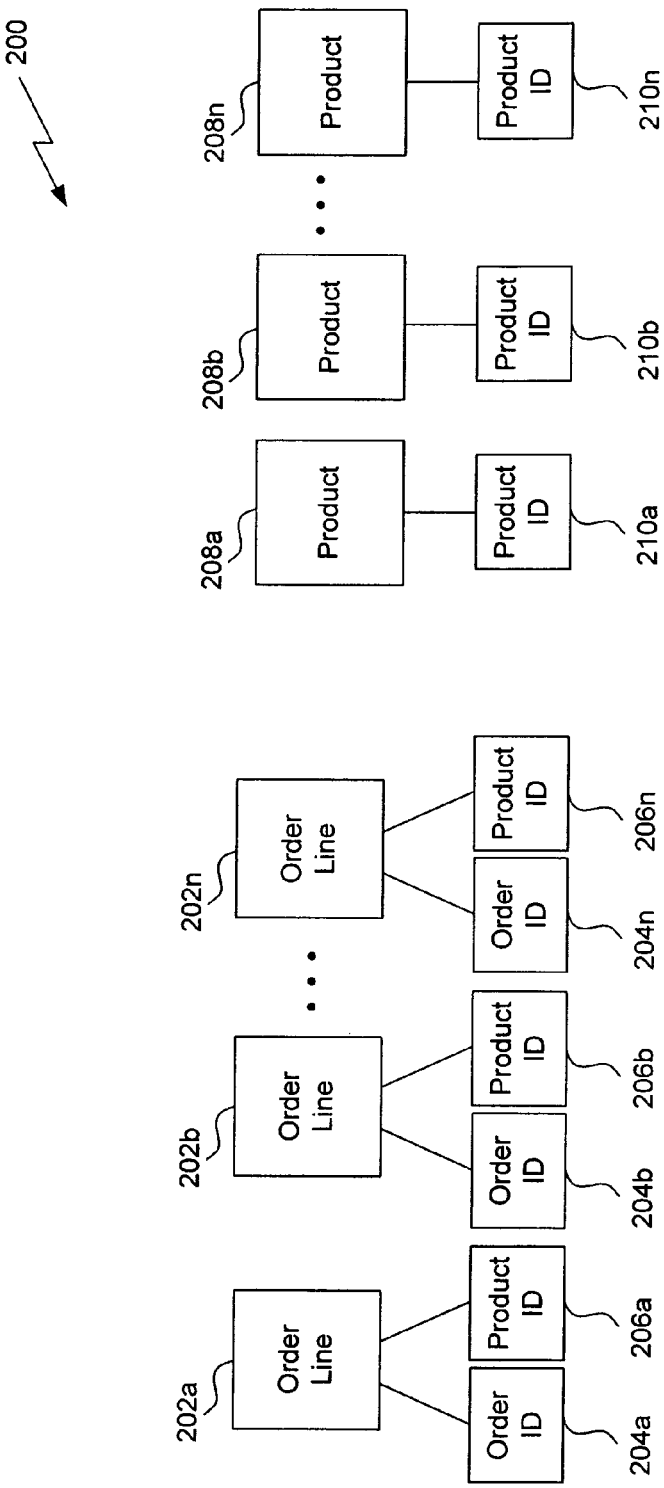
FIG. 2 illustrates an object-oriented hierarchy, in accordance with an embodiment of the present invention.

Applications are often developed in accordance with object-oriented programming (OOP) practices. FIG. 2 illustrates an object-oriented hierarchy 200 for an example application, in accordance with an embodiment of the present invention. In this example hierarchical illustration of the application, there is a set of order lines 202a-202n (collectively "202"), each comprising an order ID 204a-204n (collectively "204") and a product ID 206a-206n (collectively "206"). The order ID 204 for each order line 202 is a distinct value which identifies the particular order line 202 associated with the order ID 204. Each order line 202 is associated with a particular product ID 206 which is used to identify a particular product which is the subject of an order, in accordance with an embodiment of the present invention. Product IDs 206 need not be unique, as multiple orders represented by order lines 202 can be placed for the same particular product.

Available products are shown in FIG. 2 as products 208a-208n (collectively "208"), each associated with a product ID 210a-210n (collectively "210"). Product IDs 210 are used to identify each of the products 208 and are therefore unique values, in accordance with an embodiment of the present invention.

An application developer utilizing this object-oriented hierarchy 200 would create at least two objects: an order line object and a product object. The order line object would have fields for an order ID and a product ID, and the product object would have a field for its product ID, among other possible fields, in accordance with an embodiment of the present invention. In order to determine which product 208 is associated with a particular order line 202, the developer would first locate the order line 202 by its unique order ID 204, determine the associated product ID 206, and determine the associated product 208 using product ID 206 to find a matching product ID 210.

It is possible to simply maintain all of this data in accordance with the object-oriented hierarchy 200 within the application itself, but due to efficiency concerns, a database server such as database server 104 in FIG. 1 is employed to store the data from object-oriented hierarchy 200, in accordance with an embodiment of the present invention.

Figure 3:
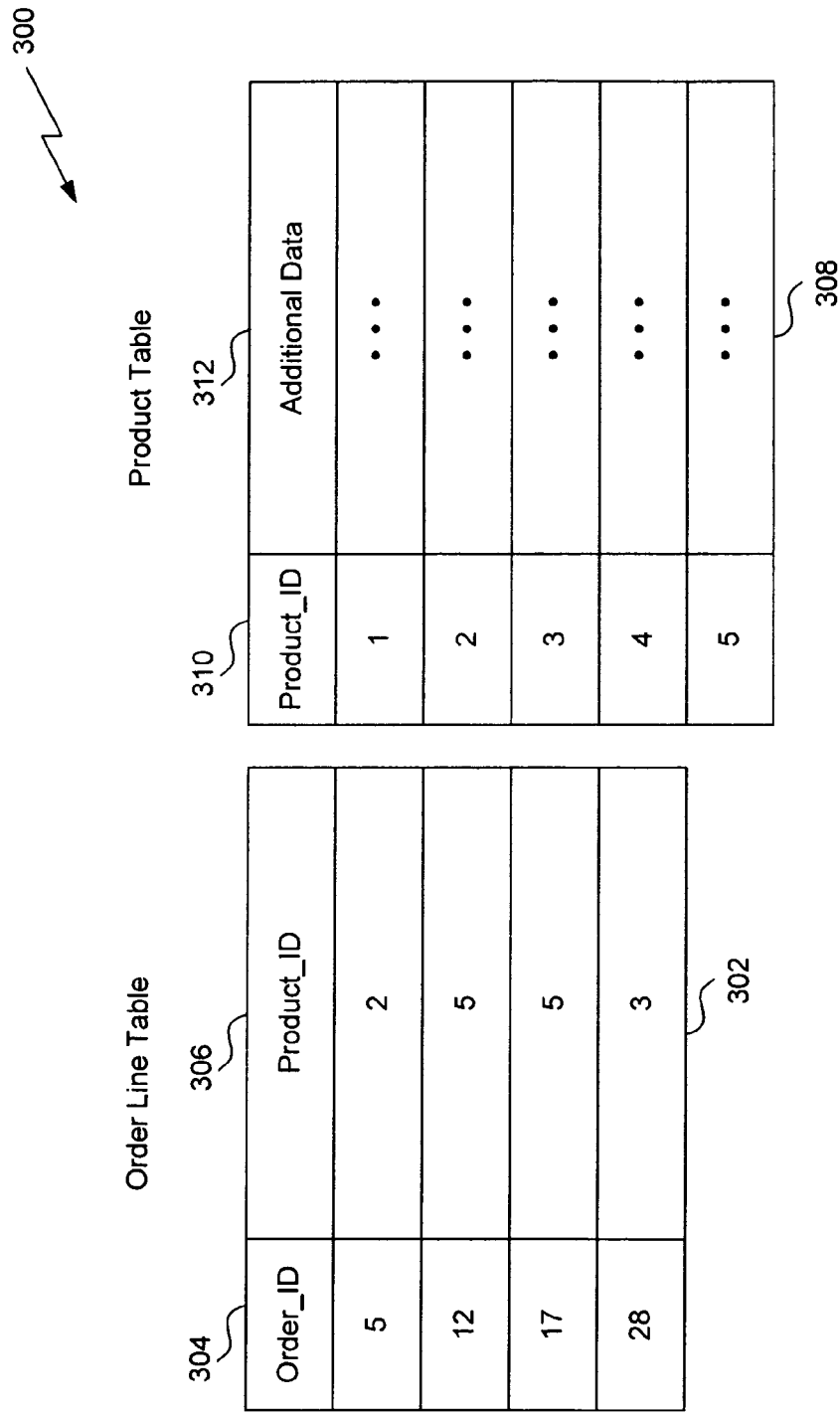
FIG. 3 illustrates a relational table database, in accordance with an embodiment of the present invention.

Databases traditionally operate on data stored in tables. FIG. 3 shows an example database 300 containing tables 302 and 308, in accordance with an embodiment of the present invention. Tables 302 and 308 are designed to hold the data from object-oriented hierarchy 200, in accordance with an embodiment of the present invention. With continuing reference to FIG. 2, table 302 is the order line table, wherein each row of table 302 represents a separate order line object 202. Each row of table 302 has a field for an order ID 304 and a product ID 306, representing order IDs 204 and product IDs 206. Table 308 is the product table, wherein each row of table 308 represents a separate product object 208. Each row of table 308 has a field for a product ID 310, representing product IDs 210, and some additional data 312.

If a user of an application running on an application server such as application server 102 in FIG. 1 needs to retrieve product information for a product associated with a particular order line, in accordance with object-oriented hierarchy 200 in FIG. 2, wherein the data is stored on a database server such as database server 104 in FIG. 1 in a database such as database 300 in FIG. 3, the user must issue a query for the desired data, in accordance with an embodiment of the present invention. Given the object-oriented implementation of the application, it is most intuitive to retrieve the data by issuing two queries such as in the following example:

1: select * from OrderLine where Order_ID=12
    2: select * from Product where Product_ID=5

With reference to FIG. 3, line 1 of the above code example requests all fields 304 and 306 from the OrderLine table 302 where the order ID field 304 matches the value '12'. The result of this query is, among other returned values, the value '5' for the product ID field 306. Now that the product ID 306 is known, it is possible to determine any information available for the product associated with product ID 306. Line 2 of the above code example requests all such information from the product table 308 where the product ID field 310 matches the value '5', and accordingly all fields associated with product ID '5' are returned.

Despite the simplicity of the request, it was necessary for the application server 102 to send two separate queries to database server 104 in order to obtain the necessary data. This is because, in order to request the data in the second query, the application server 102 required knowledge of the result provided by the database server 104 in response to the first query.

One skilled in the relevant art will appreciate that the above examples merely show one particular translation of object-oriented data into a tabular format for use in traditional database systems, and that additional methods of storing object-oriented data in a database are equally applicable. Accordingly, the invention includes any manner of storing relational data in a database.

When transmitting queries and replies between application server 102 and database server 104 over communication link 106, it is necessary to consider the inefficiency of the communication link 106. A single request for data to the database server 104, resulting in a single reply to application server 102 containing all needed data would make optimal use of the communication link 106. With the above code example, all that the application server 102 is really interested in is the result of the second query, so there are inefficiencies associated with an additional round-trip of communications.

Similar inefficiencies result when multiple queries use common parameters for the request and are nevertheless transmitted as part of a separate communication.

2. Named Transactions

In accordance with an embodiment of the present invention, a section of application code running in an application server such as application server 102 in FIG. 1 may be designated as part of a named transaction. Each named transaction has a unique name with which it is associated, in accordance with an additional embodiment of the present invention.

A named transaction includes a number of queries within the associated section of application code. In accordance with an embodiment of the present invention, the bounds of the named transaction are selected such that the starting boundary determines when a transaction is started by the application server 102, and the ending boundary determines when the transaction is committed or rolled back on the database server 104. In this respect, it is possible to view named transactions as behaving in a similar manner to a lock. In accordance with a further embodiment of the present invention, results are temporarily saved for the duration of a named transaction for efficient usage, and the saved results are only flushed if an operation that would affect the results, such as an update, insertion, or deletion, is performed.

One skilled in the relevant art will further appreciate that during the execution of the application on application server 102, wherein application server 102 is running a multi-threaded environment, multiple independent instances of a same named transaction can be active simultaneously on separate threads.

3. Prefetch Assertions

A prefetch assertion is an expression defined within the scope of a named transaction, in accordance with an embodiment of the present invention. Prefetch assertions represent the hypothesis that whenever a first query is performed within the scope of a particular named transaction, a second query will also be run within the scope of the named transaction, and further that the first and second queries are correlated. This relationship is written as:

nt: $eq1 \rightarrow eq2$ where 'nt' is the named transaction, and eq1 and eq2 are the first and second queries, respectively.

In accordance with an embodiment of the present invention, queries may be correlated by parameter correlation or by result correlation. Parameter correlation exists between a first query and a second query if the parameters to the first query match the parameters to the second query. Result correlation exists between a first query and a second query if one of the results of the first query is a parameter for the second query. Because there is a potential for the reuse of common data, this data is prefetched within the scope of a named transaction.

The following queries illustrate an example of parameter correlation:

1: select c1, c2, c3 from t1 where c3=X
2: select c4, c5, c6 from t2 where c6=X

The first and second queries both rely on a common parameter, 'X'. By transmitting the first query to the database server, waiting for the result, then transmitting the second query and obtaining the result, two round-trip communications are made when parameter 'X' need only be transmitted a single time.

In accordance with an embodiment of the present invention, if the first and second queries above are part of the same named transaction, and a relationship $eq1 \rightarrow eq2$ is established, then the value 'X' is stored by the database server for use in processing the second query.

The following queries illustrate an example of result correlation:

1: select c1, c2, c3 from t1 where c3=X
2: select c4, c5, c6 from t2 where c6=(c2 from eq1)

The second query relies on a result from the first query, in this case the result for column c2 from the first query. One skilled in the relevant art will appreciate that if table t1 contains multiple entries c3 matching parameter 'X', then a result row will be returned for each matching entry c3. Accordingly, it is possible for multiple entries c2 for which c3 matches parameter 'X' to exist. If there are multiple result entries c2, then it becomes necessary to execute the second query once per result entry c2. Each additional query compounds the effects of inefficiencies associated by communication link 106 in FIG. 1.

In accordance with an embodiment of the present invention, if the first and second queries above are part of the same named transaction, and a relationship $eq1 \rightarrow eq2$ is established, then the resulting entries c2 from the first query are stored or recalculated by the database server for use in processing the second query.

The assertion $eq1 \rightarrow eq2$ within the scope of a named transaction may be performed manually or automatically. It is possible to analyze a set of queries to determine the relationships between them for the purpose of creating prefetch assertions. One skilled in the art will appreciate that an assertion need not identify a valid correlation in order to provide correct results in a subsequent query, as any data that is prefetched in accordance with an assertion that was prefetched in error will simply not be used by a subsequent query. However, performing additional queries and storing additional data may result in other inefficiencies.

4. Parameter and Result Qualifiers

Prefetch assertions may be further qualified by the addition of a parameter qualifier or a result qualifier. Parameter qualifiers and result qualifiers are used to limit the types of correlations that can be used by the system at run-time, in accordance with an embodiment of the present invention.

A prefetch assertion using a result qualifier is written in the form:

nt: $eq1[cf] \rightarrow eq2$ where 'cf' indicates the name or index of a column in the result set of query eq1 which matches the parameter of query eq2, in accordance with an embodiment of the present invention.

A prefetch assertion using a parameter qualifier is written in the form:

nt: $eq1 \rightarrow eq2[?n]$ where 'n' indicates the index of a parameter of query eq1 which matches the parameter of query eq2, in accordance with an embodiment of the present invention.

By detailing the precise relationship between two queries in this manner, it is possible to avoid accidental correlations from being detected which do not represent an actual relationship between tables, rendering prefetching ineffective, in accordance with an embodiment of the present invention.

5. Query Batching

Figure 4:
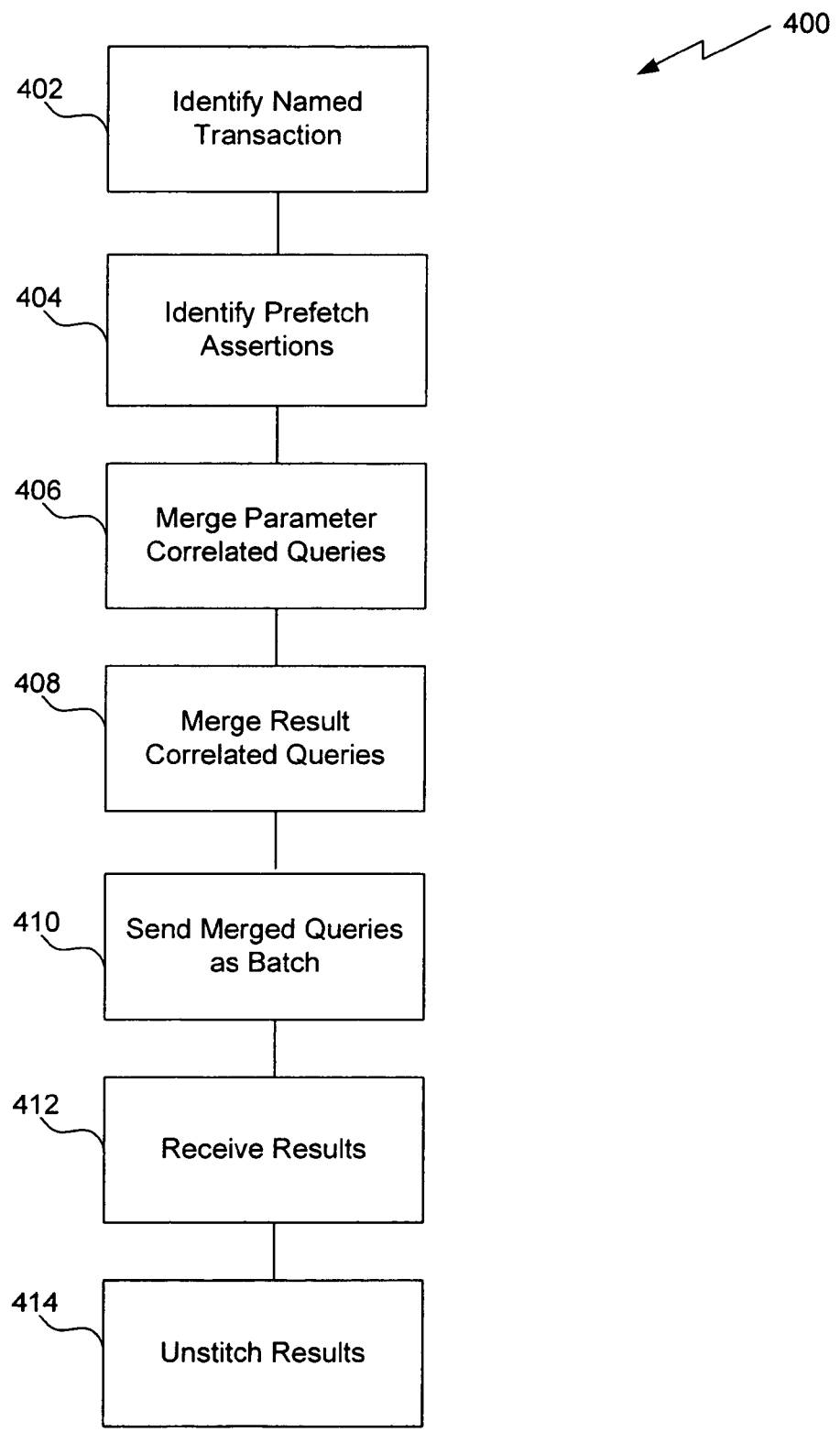
FIG. 4 is a flowchart illustrating the steps by which correlated queries are sent to a database server for processing, in accordance with an embodiment of the present invention.

FIG. 4 depicts flowchart 400 which shows the steps by which correlated queries are sent to the database server for processing, in accordance with an embodiment of the present invention. At step 402, a named transaction is identified, and at step 404 the associated prefetch assertions are identified.

Based on the prefetch assertions, any parameter correlated queries are merged at step 406. In an embodiment, parameter correlated queries are merged by appending the second query to the first query. For example, the previously discussed example queries:

1: select c1, c2, c3 from t1 where c3=X
2: select c4, c5, c6 from t2 where c6=X are merged in the following manner:

select c1, c2, c3 from t1 where c3=X;
select c4, c5, c6 from t2 where c6=X

At step 408, result correlated queries are merged. In order to merge result correlated queries, the queries are once more appended to one another, but before doing so the second query is rewritten to include a correlated subquery. The correlated subquery relates the query parameters of the second query to one of the result columns of the first query. For example, the previously discussed queries:

1: select c1, c2, c3 from t1 where c3=X
2: select c4, c5, c6 from t2 where c6=(c2 from eq1)

are merged in the following manner:

select c1, c2, c3 from t1 where c3=X;
select c4, c5, c6 from t2 where c6 in
    (select c2 from t1 where c3=X)

With the queries merged, the merged queries are transmitted as a batch to the database server in step 410. The database server then replies with its results in step 412. Accordingly, steps 410 and 412 represent a single round-trip communication. It should be noted that in the above example, because it is possible for c2 to be a column consisting of more than one row, the result of the second query will be a single result table containing all of the desired results. This is in contrast to executing the second query once per result in c2. At step 414, the results from this second query are unstitched, or separated, to provide the individual results for each result in c2 from the first query. In accordance with an embodiment of the present invention, the unstitching process is accomplished by comparing each of the results c2 with each of the entries c6 in the resulting table from the second query, or a variety of other ways. One skilled in the relevant art will appreciate that there are other ways in which the unstitching process may be accomplished, and accordingly the invention is not limited to the example approach described herein.

In each of the aforementioned examples, two queries which would have necessitated two round-trip communications in a prior art application can be accomplished in a single round-trip.

6. Detailed Prefetch Example

The use of prefetch assertions in conjunction with query batching can result in the reduction of many communication trips, increasing the efficiency of a communication bottleneck. This improvement is evident in the following example.

The following four queries are performed without the benefit of prefetch assertions:

```
// get details for assembly
select T.a_id, T.a_name
    from assembly_t T
    where T.a_id = ?
- executed 1 time, returns 1 row
// get "bill of materials" for assembly
select T.b_assembly_id, T.b_component_id
    from bom_t T
    where T.b_assembly_id = ?
- executed 1 time, returns 5 rows
// get details for component in assembly
```

```
select T.c_id, T.c_name
    from component_t T
    where T.c_id = ?
- executed 5 times, returns 1 row each time
// get details for inventory of component
select T.i_id, T.i_quantity
    from inventory_t T holdlock
    where T.i_id = ?
- executed 5 times, returns 1 row each time
```

Each time one of the aforementioned queries is executed, there is a communication round-trip during which the query is sent and the result is received. However, with the benefit of prefetch assertions, it is possible to perform all of the above queries in a single round-trip. In order to do so, the following prefetch assertions are used over the entire named transaction:

```
assembly_t -> bom_t [?a_id]
bom_t [b_component_id] -> component_t
bom_t [b_component_id] -> inventory_t
```

The following queries are all transmitted to the database server as part of a single batch, and four result sets are returned. The first result set is 1 row and corresponds to the first query. The second result set is 5 rows and corresponds to the second query. The third and fourth result sets, corresponding to the third and fourth queries, are 5 rows apiece. However, it is necessary to unstitch these results in accordance with step 414 in FIG. 4 to produce 5 individual rows for each of the third and fourth queries.

The first query in the batch is the same as without prefetch assertions:

```
select T.a_id, T.a_name
    from assembly_t T
    where T.a_id = ?
```

However, the execution of this query triggers the first prefetch assertion, which uses parameter correlation. Accordingly, the parameter 'a_id' is retained for use with the subsequent query on table 'bom_t':

```
select T.b_assembly_id, T.b_component_id
    from bom_t T
    where T.b_assembly_id = ?
```

The parameter 'a_id' is readily substituted into this query without the need to retransmit the parameter and engage in an additional round-trip. Now that a query has been performed on table 'bom_t', the second and third prefetch assertions kick in, holding the result column 'b_component_id' for use in querying tables 'component_t' and 'inventory_t', as follows:

```
select T.c_id, T.c_name
    from component_t T
    where T.c_id in
```

-continued

```
        (select T1.b__component__id
            from bom__t T1
                where T1.b__assembly__id = ?)
    select T.i__id, T.i__quantity
        from inventory__t T holdlock
        where T.i__id in
            (select T1.b__component__id
                from bom__t T1
                    where T1.b__assembly__id = ?)
```

It should be noted that the aforementioned example usage of prefetch assertions is provided solely for the purposes of illustration, and not limitation.

7. Example Computer System Implementation

Figure 5:
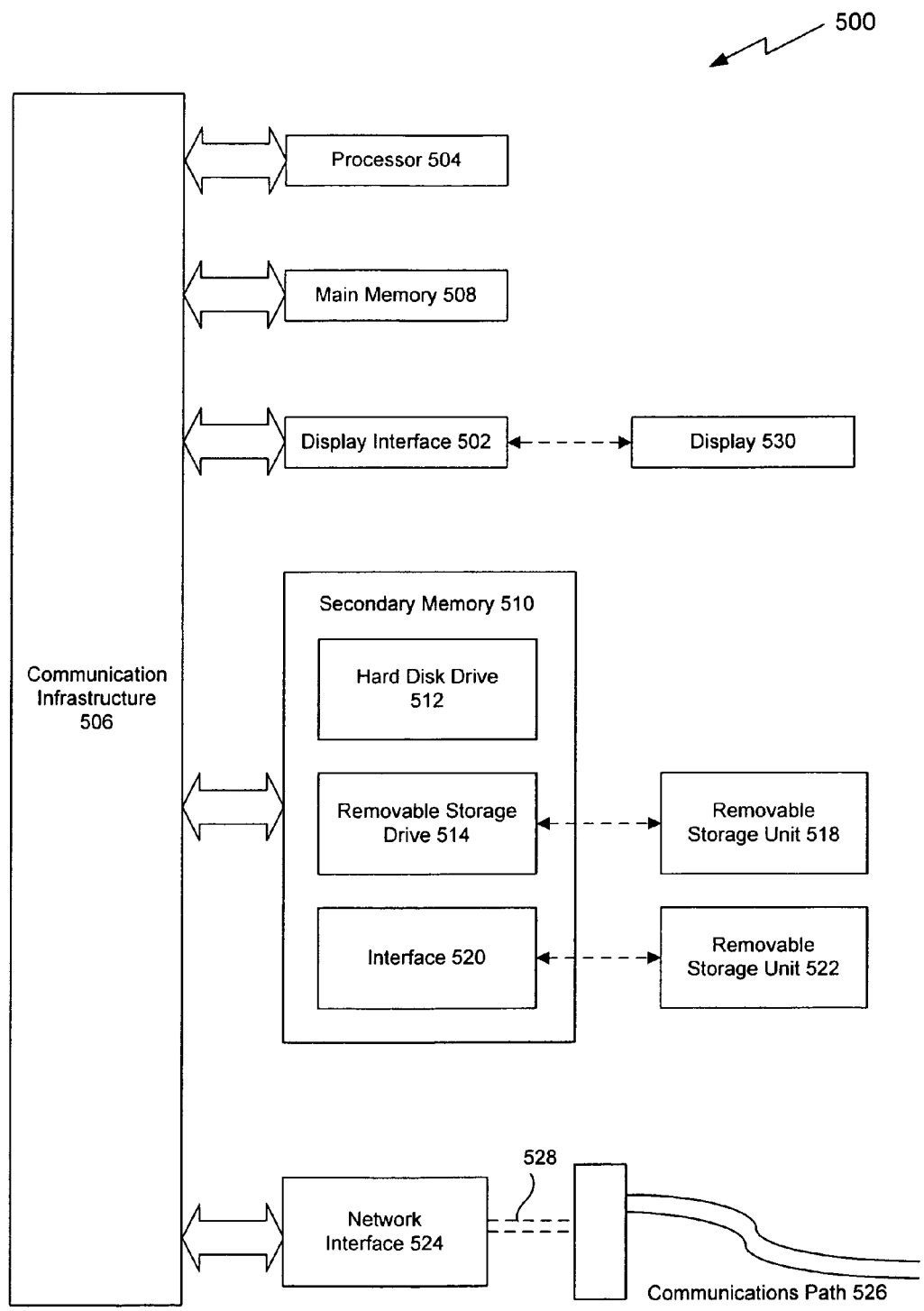
FIG. 5 depicts an example computer system in which the present invention may be implemented.

Various aspects of the present invention can be implemented by software, firmware, hardware, or a combination thereof. FIG. 5 illustrates an example computer system 500 in which the present invention, or portions thereof, can be implemented as computer-readable code. For example, the method illustrated by flowchart 400 of FIG. 4 can be implemented in system 500. Various embodiments of the invention are described in terms of this example computer system 500. After reading this description, it will become apparent to a person skilled in the relevant art how to implement the invention using other computer systems and/or computer architectures.

Computer system 500 includes one or more processors, such as processor 504. Processor 504 can be a special purpose or a general purpose processor. Processor 504 is connected to a communication infrastructure 506 (for example, a bus or network).

Computer system 500 also includes a main memory 508, preferably random access memory (RAM), and may also include a secondary memory 510. Secondary memory 510 may include, for example, a hard disk drive 512, a removable storage drive 514, and/or a memory stick. Removable storage drive 514 may comprise a floppy disk drive, a magnetic tape drive, an optical disk drive, a flash memory, or the like. The removable storage drive 514 reads from and/or writes to a removable storage unit 518 in a well known manner. Removable storage unit 518 may comprise a floppy disk, magnetic tape, optical disk, etc. which is read by and written to by removable storage drive 514. As will be appreciated by persons skilled in the relevant art(s), removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 are in the form of signals which may be electronic, electromagnetic, optical, or other signals capable of being received by communications interface 524. These signals are provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, a hard disk installed in hard disk drive 512, and signals carried over communications path 526. Computer program medium and computer usable medium can also refer to memories, such as main memory 508 and secondary memory 510, which can be memory semiconductors (e.g. DRAMs, etc.). These computer program products are means for providing software to computer system 500.

Computer programs (also called computer control logic) are stored in main memory 508 and/or secondary memory 510. Computer programs may also be received via communications interface 524. Such computer programs, when executed, enable computer system 500 to implement the present invention as discussed herein. In particular, the computer programs, when executed, enable processor 504 to implement the processes of the present invention, such as the steps in the method illustrated by flowchart 400 of FIG. 4 discussed above. Accordingly, such computer programs represent controllers of the computer system 500. Where the invention is implemented using software, the software may be stored in a computer program product and loaded into computer system 500 using removable storage drive 514, interface 520, hard drive 512 or communications interface 524.

The invention is also directed to computer products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage device, etc.), and communication mediums (e.g., wired and wireless communications networks, local area networks, wide area networks, intranets, etc.).

8. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method comprising:

identifying reliance by a first relational database query and a second relational database query on a common qualifier, wherein the common qualifier establishes a relationship that exists within a named transaction corresponding to the first and second relational database queries;
creating a prefetch assertion correlating the first query with the second query within a transaction based on the common qualifier;
merging the first query with the second query based on the prefetch assertion;
transmitting the merged queries to a database server; and
receiving results for the merged queries from the database server.

2. The method of claim 1, further comprising:
unstitching the received results.

3. The method of claim 1, wherein the first query and the second query are parameter correlated queries.

4. The method of claim 3, wherein merging the first query and the second query comprises:
appending the second query to the first query.

5. The method of claim 1, wherein the first query and the second query are result correlated queries.

6. The method of claim 5, wherein merging the first query with the second query comprises:
rewriting the second query to include a correlated sub-query; and
appending the second query to the first query.

7. The method of claim 1, wherein transmitting the merged queries comprises:
transmitting the merged queries as a batch.

8. The method of claim 1, wherein the prefetch assertion further indicates that the second query will run within the scope of the transaction whenever the first query is run within the scope of the transaction.

9. A computer-readable storage medium having stored thereon computer-executable instructions that, when executed by a computing device, cause the computing device to perform a method comprising:
identifying reliance by a first relational database query and a second relational database query on a common qualifier, wherein the common qualifier establishes a relationship that exists within a named transaction corresponding to the first and second relational database queries;
creating a prefetch assertion correlating the first query with the second query within a transaction based on the common qualifier;
merging the first query with the second query based on the prefetch assertion;
transmitting the merged queries to a database server; and
receiving results for the merged queries from the database server.

10. The computer-readable storage medium of claim 9, the method further comprising:
unstitching the received results.

11. The computer-readable storage medium of claim 9, wherein the first query and the second query are parameter correlated queries.

12. The computer-readable storage medium of claim 11, wherein merging the first query and the second query comprises:
appending the second query to the first query.

13. The computer-readable storage medium of claim 9, wherein the first query and the second query are result correlated queries.

14. The computer-readable storage medium of claim 13, wherein merging the first query with the second query comprises:
rewriting the second query to include a correlated sub-query; and
appending the second query to the first query.

15. The computer-readable storage medium of claim 9, wherein transmitting the merged queries comprises:
transmitting the merged queries as a batch.

16. The computer-readable storage medium of claim 9, wherein the prefetch assertion further indicates that the second query will run within the scope of the transaction whenever the first query is run within the scope of the transaction.

17. A system comprising:
a memory storing:
an identifying module configured to identify reliance by a first relational database query and a second relational database query on a common qualifier, wherein the common qualifier establishes a relationship that exists within a named transaction corresponding to the first and second relational database queries;
a creating module configured to create a prefetch assertion correlating the first query with the second query within a transaction based on the common qualifier;
a merging module configured to merge the first query with the second query based on the prefetch assertion;
a transmitting module configured to transmit the merged queries to a database server; and
a receiving module configured to receive results for the merged queries from the database server; and
a processor configured to process the modules.

18. The system of claim 17, wherein the prefetch assertion further indicates that the second query will run within the scope of the transaction whenever the first query is run within the scope of the transaction.

19. The system of claim 17, further comprising:
an Unstitching module configured to unstitch the received results.

20. The system of claim 17, wherein the creating module is configured to create the prefetch assertion correlating the first query and the second queries based on parameter correlation between the first query and the second query.

21. The system of claim 20, wherein the merging module is further configured to append the second query to the first query.

22. The system of claim 17, wherein the creating module is configured to create the prefetch assertion correlating the first query and the second queries based on result correlation between the first query and the second query.

23. The system of claim 22, wherein the merging module is further configured to:
rewrite the second query to include a correlated subquery; and
append the second query to the first query.

24. The system of claim 17, wherein the transmitting module is further configured to transmit the merged queries as a batch.

* * * * *